(12) United States Patent
Krüger et al.

(10) Patent No.: US 9,409,703 B2
(45) Date of Patent: Aug. 9, 2016

(54) PORTION CAPSULE FOR PRODUCING A BEVERAGE USING A PORTION CAPSULE

(71) Applicant: K-FEE SYSTEM GMBH, Bergisch Gladbach (DE)

(72) Inventors: Marc Krüger, Bergisch Gladbach (DE); Günter Empl, Bergisch Gladbach (DE)

(73) Assignee: K-Fee System GmbH, Bergisch Gladbach (DE)

( * ) Notice: Subject to any disclaimer, the term of this patent is extended or adjusted under 35 U.S.C. 154(b) by 26 days.

(21) Appl. No.: 13/888,809

(22) Filed: May 7, 2013

(65) Prior Publication Data

US 2013/0243910 A1    Sep. 19, 2013

Related U.S. Application Data

(63) Continuation of application No. PCT/EP2012/070059, filed on Oct. 10, 2012.

(30) Foreign Application Priority Data

Oct. 13, 2011    (DE) .......................... 10 2011 115 833

(51) Int. Cl.
*B65D 85/816* (2006.01)
*B65D 85/804* (2006.01)
(Continued)

(52) U.S. Cl.
CPC ............. *B65D 85/8043* (2013.01); *A23F 3/16* (2013.01); *A23F 5/24* (2013.01); *A47J 31/0668* (2013.01); *B65B 29/02* (2013.01); *B65D 2081/007* (2013.01)

(58) Field of Classification Search
CPC ........... B65D 85/8043; B65D 85/8046; B65D 2081/007; B65B 29/02; A47J 31/0668; A23F 3/16; A23F 5/24

USPC ........ 426/77–84, 115, 394, 431–435; 99/335, 99/489, 491, 503, 505, 508, 464, 469, 473, 99/474, 477, 482, 295, 323
See application file for complete search history.

(56) References Cited

U.S. PATENT DOCUMENTS

| 2,926,088 | A | | 2/1960 | Spiselman | |
| 4,605,123 | A | * | 8/1986 | Goodrum | B65D 85/808 206/0.5 |

(Continued)

FOREIGN PATENT DOCUMENTS

| EP | 0512468 A1 | 11/1992 |
| EP | 1344722 A1 | 9/2003 |

(Continued)

OTHER PUBLICATIONS

Machine translation of JP 2002-223720A.*

*Primary Examiner* — Drew Becker
(74) *Attorney, Agent, or Firm* — McNees Wallace & Nurick LLC

(57) ABSTRACT

A portion capsule for producing a beverage has a capsule body with a capsule base and a filling side. A cavity for accommodating a pulverulent or liquid beverage base is formed between the capsule base and the filling side, and a filter element is arranged between the beverage base and the capsule base The filter element includes an open-pore felt and/or nonwoven. The felt and/or the nonwoven have/has an average first pore size in a first region which faces the beverage base and an average second pore size in a second region which faces the capsule base, wherein the first pore size is smaller than the second pore size.

9 Claims, 1 Drawing Sheet

(51) Int. Cl.
    *A23F 3/16*         (2006.01)
    *A23F 5/24*         (2006.01)
    *A47J 31/06*       (2006.01)
    *B65B 29/02*       (2006.01)
    *B65D 81/00*       (2006.01)

(56) References Cited

U.S. PATENT DOCUMENTS

| | | | | |
|---|---|---|---|---|
| 5,008,013 | A * | 4/1991 | Favre | B01D 29/03 |
| | | | | 210/482 |
| 5,411,661 | A * | 5/1995 | Heiligman | 210/264 |
| 5,644,973 | A * | 7/1997 | Kang et al. | 99/289 R |
| 6,810,788 | B2 * | 11/2004 | Hale | 99/295 |
| 2003/0172813 | A1 | 9/2003 | Schifferle | |
| 2005/0172822 | A1 * | 8/2005 | Macchi et al. | 99/295 |
| 2008/0299262 | A1 | 12/2008 | Reati | |
| 2010/0239717 | A1 * | 9/2010 | Yoakim | B65D 85/8043 |
| | | | | 426/84 |
| 2010/0260896 | A1 * | 10/2010 | Yoakim et al. | 426/77 |
| 2012/0070543 | A1 * | 3/2012 | Mahlich | 426/77 |
| 2012/0070551 | A1 * | 3/2012 | Mahlich | 426/433 |
| 2012/0263830 | A1 * | 10/2012 | Kamerbeek et al. | 426/77 |
| 2012/0328744 | A1 * | 12/2012 | Nocera | 426/106 |
| 2013/0216663 | A1 * | 8/2013 | Dogan et al. | 426/115 |
| 2014/0220190 | A1 * | 8/2014 | Giovanni | 426/115 |

FOREIGN PATENT DOCUMENTS

| | | | | |
|---|---|---|---|---|
| EP | 1792850 | A1 | 6/2007 | |
| EP | 2100824 | A1 | 9/2009 | |
| JP | 2002233720 | A | 8/2002 | |
| JP | 2002238768 | A | 8/2002 | |
| JP | 2004337405 | A | 12/2004 | |
| WO | WO-2010137961 | A1 * | 12/2010 | B65D 85/804 |

\* cited by examiner

PORTION CAPSULE FOR PRODUCING A BEVERAGE USING A PORTION CAPSULE

CROSS REFERENCE TO RELATED APPLICATIONS

This application is a Continuation of International Application No. PCT/EP2012/070059, filed on Oct. 10, 2012, entitled PORTION CAPSULE FOR PRODUCING A BEVERAGE WITH A PORTION CAPSULE which application is hereby incorporated by reference in its entirety.

BACKGROUND

The present invention relates to a portion capsule for producing a beverage, having a capsule body with a capsule base and a filling side, wherein a cavity for accommodating a pulverulent or liquid beverage base is formed between the capsule base and the filling side, and wherein a filter element is arranged between the beverage base and the capsule base.

Portion capsules of this kind are generally known from the prior art. By way of example, documents EP 1792850 B1, EP 1344722 A1 and US 2003/0172813 A1 disclose portion capsules of this generic type for preparing coffee and espresso.

Portion capsules of this kind for producing a beverage are preferably in the form of a truncated cone or cylinder and are produced, for example, from a thermoformed plastic film or using a plastic injection molding process. Said portion capsules usually have an open filling side with a collar edge onto which a cover film or foil is sealed or adhesively bonded, a closed capsule base, with a particle screen which is supported against the capsule base being arranged between the beverage base and the capsule base. These screens are either injection molded from a thermoplastic or are thermoformed or stamped from a plastic film.

For the purpose of preparing a coffee beverage, the portion capsule is inserted into a brewing chamber of a preparation appliance. After or during the closing process of the brewing chamber, the capsule is preferably opened on its closed base side by means of a discharge mandrel which is arranged in the brewing chamber and, after the brewing chamber is sealed off, the filling side of the portion capsule, which filling side is sealed off by a sealing film or foil, is tapped by means of a puncturing means. Preparation liquid, preferably hot water, is then delivered into the portion capsule under pressure. The preparation liquid flows through the beverage base and extracts and/or dissolves the substances, which are required for producing the beverage, from the beverage base. For the purpose of preparing an espresso, for example a brewing water pressure of up to 20 bar acts on the coffee powder for the purpose of extracting the essential oils. This pressure also acts on the filter medium which is situated between the coffee powder and the capsule base and in front of the punctured capsule outlet.

The sudden pressure loss on the lower face of the filter medium leads to the formation of froth in the beverage, for example in the form of a crema of a coffee beverage. However, the formation of froth is undesirable for certain beverages, for example a classic filter coffee without crema which is consumed in the USA and Scandinavia.

Therefore, the object of the present invention was to provide a portion capsule having a filter arrangement, in which the level of the formation of froth achieved is reduced in comparison to the prior art to virtually zero or in which the formation of froth is entirely avoided, even when the portion capsule is extracted in a high-pressure extraction machine.

SUMMARY

This object is achieved by a portion capsule for producing a beverage, having a capsule body with a capsule base and a filling side, wherein a cavity for accommodating a pulverulent or liquid beverage base is formed between the capsule base and the filling side, wherein a filter element is arranged between the beverage base and the capsule base, wherein the filter element comprises an open-pore nonwoven and/or felt, and wherein the felt and/or the nonwoven have/has an average first pore size in a first region which faces the beverage base and an average second pore size in a second region which faces the capsule base, wherein the first pore size is smaller than the second pore size.

By way of the portion capsule according to the invention, it is advantageously possible, in comparison to the prior art, for the first time, to produce a crema-free filter coffee using a high-pressure coffee machine (with extraction pressures of up to 20 bar). In particular, it is therefore also possible, for the first time, to produce crema-free filter coffee by means of a high-pressure portion capsule machine. These advantages are achieved in that the extraction liquid can already expand as it passes through the filter element, with the result that there is no abrupt pressure loss at the lower face of the filter element. The formation of froth is therefore considerably reduced in comparison to the prior art or entirely prevented depending on the coffee and the degree of grinding of said coffee. At the same time, a low pore size is possible on that side which faces the beverage substance, with the result that effective filtering is achieved and no fine particles which would lead, for example, to undesired contamination of the beverage are swept out of the capsule into the beverage. The portion capsule within the meaning of the present invention comprises a hermetically sealed portion capsule. This means that the beverage or food powder, for example coffee powder, soup powder or tea, which is located in the portion capsule is sealed off from the environment in a substantially aroma-tight manner before the extraction process. The filter element preferably comprises one, two or three support layers which are correspondingly needled or entangled in order to form the felt. A high-pressure portion capsule machine within the meaning of the present invention comprises, in particular, a portion capsule machine which can build up a pressure of up to 20 bar. A high-pressure portion capsule machine of this kind is then, for example, also able to produce espresso and coffee with crema when using conventional portion capsules, that is to say portion capsules which do not have the features according to the invention. It is feasible for the filter element to be formed from a nonwoven or felt material without differentiated layers. In other words, no clear separation layers, but rather an undefined transition, are provided between the first and the second region.

According to a further embodiment of the present invention, provision is made for the filter element to have a support layer, wherein the support layer has a different entanglement and/or different fibers and/or fibers with different fiber thicknesses and/or different thermal treatment on that side which faces the beverage substance and on that side which faces the capsule base. Therefore, comparatively simple and cost-effective production of the filter element having the first and second regions which have two different pore sizes is advantageously possible.

According to a further embodiment of the present invention, provision is made for the filter element to have a first felt layer and a second felt layer, wherein the first felt layer is arranged on a side of the filter element which faces the beverage base, and wherein the second felt layer is arranged on a side of the filter element which faces the capsule base, wherein the first felt layer has the first pore size on average and the second felt layer has the second pore size on average. The filter element with the two different pore sizes is advantageously realized in a particularly simple manner by the use of two different felt layers. The two felt layers preferably lie loosely one on the other or are fixedly connected to one another, for example the two layers are needled, woven, adhesively bonded and/or welded to one another.

According to a further embodiment of the present invention, provision is made for the felt in the first region and/or the first felt layer to be formed from fibers with an average first fiber diameter, and that the felt in the second region and/or the second felt layer are/is formed from fibers with an average second fiber diameter, wherein the first fiber diameter is, on average, smaller than the second fiber diameter. The different pore diameters can advantageously be realized in a simple manner by means of different fiber diameters.

According to a further embodiment of the present invention, provision is made for the felt to comprise a felt material which is produced from fine plastic fibers, for example fine polyester fibers, and is, in particular, a random fiber felt material and/or a fiber-oriented felt material. The felt preferably has a mass per unit area (also called the grammage or the basis weight) of between 40 and 1600 grams per square meter, particularly preferably of between 200 and 900 grams per square meter, and very particularly preferably of substantially 650 grams per square meter. As an alternative, a felt with a mass per unit area of substantially 1150 grams per square meter is very particularly preferably provided. The felt preferably has a thickness of between 0.20 and 5 millimeters, particularly preferably of between 1.5 and 3.5 millimeters, and very particularly preferably of substantially 3.2 millimeters. The felt is formed in such a way that the air permeability of the felt is preferably between 200 and 3000 $l/(m^2 s)$, particularly preferably between 200 and 1000 $l/(m^2 s)$, and very particularly preferably substantially 600 $l/(m^2 s)$ at 100 pascal. It has surprisingly and unforeseeably been found that optimum results in terms of extraction efficiency, mixing and outflow behavior and also blockage resistance can be achieved with felt materials of this kind.

The felt is preferably arranged on the base of the capsule such that it rests on as large a surface area as possible. The felt is particularly preferably sealed to the base, in particular by ultrasound.

According to a further subject matter or a further embodiment of the present invention, the filter element has a felt structure. Said felt structure is, in particular, a needle felt structure. The filter element preferably consists of at least a felt structure and a support structure, in particular a woven structure, wherein the felt structure, at least in a subsection of the volume, particularly preferably comprises the support structure. The filter element preferably has two felt structures which are separated from one another by the support structure. The thickness of the two felt structures can be the same or different. A felt structure which faces the powder or tea is preferably thinner than the felt structure which faces the capsule base, or vice versa. The surface of the felt structure is preferably treated, for example thermally treated, in order to fix, for example, loose fibers. The filter element which has a felt structure is preferably only inserted into the capsule, in particular onto the base thereof. During perforation, the perforation means can enter this filter element. A plurality of filter elements, which have one or more felt structures and a support structure, are preferably arranged one above the other in the capsule, preferably in a manner connected to one another.

According to a further preferred embodiment of the present invention, the portion capsule has an opening in the capsule base. A sealing film or foil which covers the opening is fitted on the outside of the capsule base. The sealing film or foil can be removed, in particular pulled off, by a user before the portion capsule is inserted into the portion capsule machine. As an alternative, it is feasible for the sealing film or foil to be perforated in the brewing chamber by means of a perforation means or to be broken open or peeled off when the extraction liquid is introduced into the portion capsule. The buildup of pressure in the interior of the capsule is preferably reduced by the opening in the capsule base, with the result that a virtually crema-free coffee can be produced. The opening is arranged, in particular, centrally in the capsule base and has a maximum diameter of between 5 and 15 millimeters, preferably of between 10 and 14 millimeters, and particularly preferably of substantially 12 millimeters. The sealing film or foil preferably has a pull-off tab which is not fixedly connected to the capsule base, in order to make it easier for a user to manually remove the sealing film or foil. The sealing film or foil is preferably adhesively bonded to the capsule base.

A further subject matter of the present invention is the method for producing a beverage, wherein the portion capsule according to the invention is provided in a first step, wherein the portion capsule is inserted into a brewing chamber in a second step, and wherein a preparation liquid is introduced into the portion capsule at a pressure of up to 20 bar in a third step, in order to produce the beverage. The portion capsule is preferably formed in such a way that a pressure of between 2 and 14 bar, preferably of between 4 and 8 bar, and particularly preferably of 6 bar, builds up within the portion capsule during the extraction process.

A further subject matter of the present invention is the use of a portion capsule for producing a beverage, preferably for producing a coffee and/or tea beverage.

Exemplary embodiments of the invention are illustrated in the figures and explained in greater detail in the following description. The figures are described merely by way of example and do not restrict the general concept of the invention.

BRIEF DESCRIPTION OF THE FIGURES

In the various figures, identical parts are always provided with the same reference symbols and therefore also will be generally cited or mentioned only once in each case.

DETAILED DESCRIPTION

Figure 1:
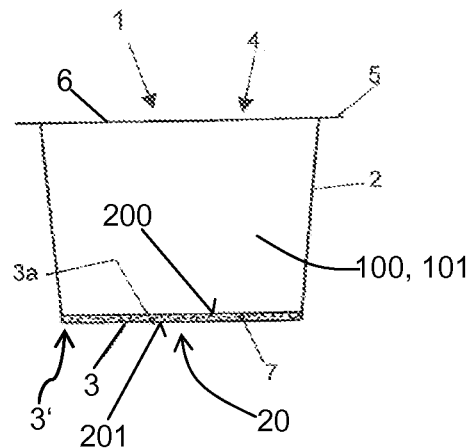
FIG. 1 shows a longitudinal section through a portion capsule according to an exemplary embodiment of the present invention, which portion capsule is designed for preparing coffee.

FIG. 1 illustrates an exemplary embodiment of the portion capsule 1 according to the invention. The portion capsule 1 comprises a capsule body 2 in the form of a truncated cone, having a capsule base 3 and having a collar edge 5 which is arranged on the filling side 4 of said capsule body and to which a cover film or foil 6 is welded or adhesively bonded. The capsule base 3 is either closed in the starting state or already has an outlet opening 20 in its starting state, said outlet opening being sealed off, for example, by means of a sealing film or foil (not shown) which can be pulled off before the extraction process or can be perforated in the brewing chamber. Therefore, a cavity 100 which is sealed off, preferably in an air- and aroma-tight manner, in the starting state of the portion capsule 1 is formed between the capsule base 3 and the cover film or foil 6, said cavity being filled with a pulverulent and granular beverage substance 101. In this case, the beverage substance 101 comprises, for example, coffee or tea granules. A filter element 7 comprising a felt is arranged on the inner side 3a of the capsule base 3, that is to say within the cavity 100. The felt is situated either loosely on the inner side 3a of the capsule base 3 or is fixedly, that is to say preferably cohesively, connected to the inner side 3a of the capsule body base 3. In the second variant, the filter element 7 is attached in a cohesive manner to the capsule base 3, in particular only in an edge region 3' of the capsule base 3. The felt preferably comprises a felt material which is produced from fine polyester fibers. The filter element 7 is preferably separated from a woven web by means of stamping, laser cutting, water-jet cutting, ultrasonic cutting and/or the like.

The felt also has a first region 200 which faces the beverage substance 101 and a second region 201 which faces the capsule base 3. The felt has, on average, a first pore size in the first region 200, whereas the felt has, on average, a second pore size in the second region 201. In this case, the first pore size is smaller than the second pore size. Therefore, the beverage which passes through the filter element 7 can begin to expand as early as in the second region 201 and therefore within the filter element 7, with the result that the sudden drop in pressure at the lower edge of the felt turns out to be lower and the formation of froth is reduced. Therefore, the formation of a crema on the coffee is completely prevented or at least considerably reduced in a unique manner when the portion capsule 1 is extracted in a high-pressure coffee machine which operates, for example, in a pressure range of up to 20 bar.

It is feasible for the felt to comprise a support material in order to realize the two different regions 200, 201 with different pore sizes, said support material being needled to different degrees in the first region 200 and in the second region 201 and/or being entangled with different fibers in the first region 200 and in the second region 201. The felt is preferably needled to a greater extent on the side which faces the beverage substance 101 than on the side which faces the capsule base 3, with the result that the pore size on the side which faces the beverage substance 101 is lower on average.

Figure 2:
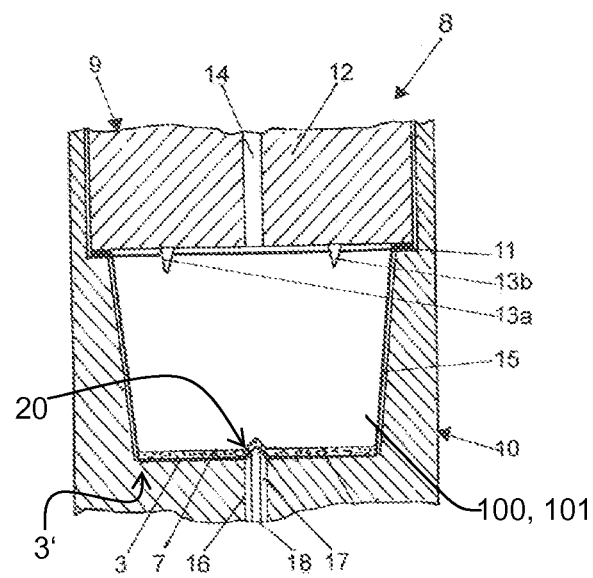
FIG. 2 shows a longitudinal section through a portion capsule, which is situated in a closed brewing chamber, according to the exemplary embodiment of the present invention.

FIG. 2 illustrates a portion capsule 1 according to the exemplary embodiment, which is illustrated in FIG. 1, of the present invention, wherein the portion capsule 1 in FIG. 2 is arranged in a closed brewing chamber 8. The brewing chamber 8 comprises a first brewing chamber element 9 and a second brewing chamber element 10, wherein the first brewing chamber element 9 is provided for the purpose of inserting the portion capsule 1 such that it can move in relation to the second brewing chamber element 10, or vice versa. A seal 11 is arranged between the two brewing chamber elements 9, 10. The first brewing chamber element 9 substantially comprises a closing piston 12 with puncturing elements 13a, 13b for opening the cover film or foil 6 of the portion capsule 1, a preparation liquid supply means 14 and the seal 11. The second brewing chamber element 10 substantially comprises a brewing chamber bell 15 which partially surrounds the portion capsule 1 and has a discharge mandrel 16 which is arranged on the base of the brewing chamber bell 15 and is provided with discharge grooves 17, and a beverage discharge 18. For the purpose of receiving the portion capsule 1, the brewing chamber 8 is in an open state (not illustrated), in which the first and the second brewing chamber element 9, 10 are spaced apart from one another, in order to ensure supply of the portion capsule 1, and in the illustrated closed state, in which a preparation process for producing a beverage using the portion capsule 1 can be carried out. In the closed state, the brewing chamber 8 is sealed off in a pressure-tight manner. When the brewing chamber 8 is moved from the open state to the depicted closed state, the cover film or foil 6 is pierced by the puncturing elements 13a, 13b, with the result that preparation liquid, in particular hot brewing water, passes through the preparation liquid supply means 14 under pressure and into the cavity 100 in the portion capsule 1. When the portion capsule 1 has a closed capsule base 3, the capsule base 3 is preferably perforated by a perforation means, which is in the form of a discharge mandrel 16, when the brewing chamber 8 is closed, with the result that an outlet opening 20 is produced in the capsule base 3, it being possible for the produced beverage liquid to leave the portion capsule 1 in the direction of the beverage discharge 18 through said outlet opening. In order to assist delivery of the beverage liquid, the discharge mandrel 16 has the discharge grooves 17 on its casing surface. In an alternative embodiment (not illustrated), the capsule base 3 has an outlet opening 20 which, in the starting state, is sealed off by a sealing film or foil in order to seal the cavity 100 in a hermetically sealed manner. Before the portion capsule 1 is inserted into the brewing chamber 8, the sealing film or foil is removed by a user by hand, with the result that the discharge mandrel 16 can project through the outlet opening 8 into the portion capsule 1 without obstruction. However, as an alternative, it is also feasible for the sealing film or foil to not be removed manually by the user but rather to be perforated by the discharge mandrel 16 when the brewing chamber 8 is closed. The preparation liquid which enters the cavity 100 under a pressure of up to 20 bar interacts with the beverage substance 101 inside the cavity 100, as a result of which the beverage is formed. The beverage then flows through the filter element 7 and through the outlet opening 20 and out of the portion capsule 1. In this case, the formation of crema is advantageously effectively prevented on account of the novel filter element 7, even though the brewing chamber 8 is operated at a pressure of up to 20 bar.

Figure 3A:
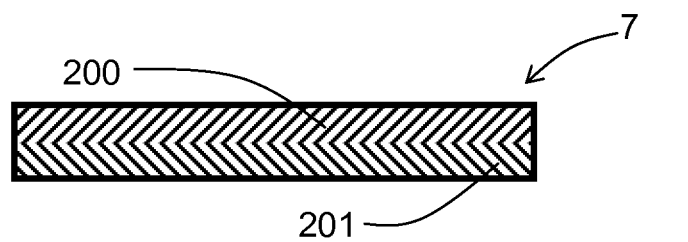
FIGS. 3a, 3b show two different embodiments of the filter element of the portion capsule according to the exemplary embodiment of the present invention.
Figure 3B:
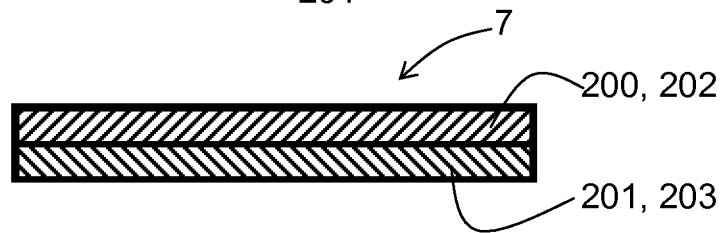

FIGS. 3a and 3b show different embodiments of the filter element 7 of the portion capsule 1 according to the exemplary embodiment which is illustrated in FIGS. 1 and 2.

The filter element 7 which is illustrated in FIG. 3a has just one single felt layer which has the first pore size in its first region 200 and the larger second pore size in its second region 201. The different pore sizes are achieved, for example, in that fibers with a first average fiber diameter are used for forming the felt in the first region 200, whereas fibers with a second average fiber diameter are used for forming the felt in the second region 201, wherein the second fiber diameter is larger than the first fiber diameter.

In contrast, the filter element 7 which is illustrated in FIG. 3b has a felt which is constructed from two separate felt layers. The felt comprises a first felt layer 202 and a second felt layer 203. In this case, the first and the second felt layer 202, 203 lie loosely one on the other or are fixedly connected to one another. It is feasible, for example, that the first and the second felt layer 202, 203 are fixedly woven, adhesively bonded or welded to one another. The first felt layer 202 has the first pore size and therefore constitutes the first region 200, whereas the second felt layer 203 has the larger second pore size and therefore represents the second region 201. As an alternative, it is also feasible for the first and second felt layer 202, 203 to be spaced apart from on another by an intermediate layer (not illustrated).

The invention claimed is:

1. A portion capsule for producing a beverage, having a capsule body with a capsule base and a filling side, wherein a cavity for accommodating a pulverulent, granular or liquid beverage base is formed between the capsule base and the filling side, and wherein a filter element is arranged between the beverage base and the capsule base, wherein the filter element comprises an open-pore felt and/or nonwoven, characterized in that the felt and/or the nonwoven have/has an average first pore size in a first layer which faces the beverage base and an average second pore size in a second layer which faces the capsule base, the first pore size is smaller than the second pore size, the two layers are fixedly connected to one another by welding, wherein the beverage which passes through the filter element expands in the second layer thereby reducing the pressure drop at the surface of the second layer of the filter element which faces the capsule base, wherein the formation of crema in the beverage is essentially prevented when the beverage is extracted in a machine which operates in a pressure range of up to 20 bar.

2. The portion capsule as claimed in claim 1, wherein the filter element has a support layer, wherein the support layer has a different entanglement and/or different fibers and/or fibers with different fiber thicknesses and/or fibers with different thermal treatment on that side which faces the beverage base and on that side which faces the capsule base.

3. The portion capsule as claimed in claim 1, wherein the first layer of the filter element is a first felt layer and the second layer is a second felt layer.

4. The portion capsule as claimed in claim 3, wherein the felt in the first felt layer is formed from fibers with an average first fiber diameter, and wherein the felt in the second felt layer is formed from fibers with an average second fiber diameter, wherein the first fiber diameter is smaller than the second fiber diameter.

5. The portion capsule as claimed in claim 4, wherein the filter has at least a third felt layer wherein the third fiber diameter is larger than the first fiber diameter and/or smaller than the second fiber diameter.

6. A method for producing a beverage, wherein a portion capsule as claimed in claim 1 is provided in a first step, wherein the portion capsule is inserted into a brewing chamber in a second step, and wherein a preparation liquid is introduced into the portion capsule at a pressure of up to 20 bar in a third step, in order to produce the beverage.

7. The portion capsule as claimed in claim 1, wherein the first layer is felt and is formed from fibers with an average first fiber diameter, and wherein the second layer is felt and is formed from fibers with an average second fiber diameter, wherein the first fiber diameter is smaller than the second fiber diameter.

8. The portion capsule as claimed in claim 2, wherein the felt in the first felt layer is formed from fibers with an average first fiber diameter, and wherein the felt the second felt layer is formed from fibers with an average second fiber diameter, wherein the first fiber diameter is smaller than the second fiber diameter.

9. The portion capsule as claimed in claim 1, wherein the pulverulent, granular or liquid beverage base is coffee or tea granules.

\* \* \* \* \*